(12) United States Patent
White, Jr. et al.

(10) Patent No.: US 10,838,950 B2
(45) Date of Patent: Nov. 17, 2020

(54) DYNAMIC REVIEW CADENCE FOR INTELLECTUAL CAPITAL

(71) Applicant: Cisco Technology, Inc., San Jose, CA (US)

(72) Inventors: David C. White, Jr., St. Petersburg, FL (US); Magnus Mortensen, Cary, NC (US); Jay Kemper Johnston, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 155 days.

(21) Appl. No.: 15/582,630

(22) Filed: Apr. 29, 2017

(65) Prior Publication Data

US 2018/0316545 A1  Nov. 1, 2018

(51) Int. Cl.
*G06F 16/23* (2019.01)
*H04L 12/24* (2006.01)

(52) U.S. Cl.
CPC ...... *G06F 16/2379* (2019.01); *G06F 16/2358* (2019.01); *H04L 41/142* (2013.01); *H04L 41/147* (2013.01); *H04L 41/069* (2013.01); *H04L 41/22* (2013.01)

(58) Field of Classification Search
CPC ......... H04L 4141/042; H04L 4141/069; H04L 4141/22; G06F 16/2379
See application file for complete search history.

(56) References Cited

U.S. PATENT DOCUMENTS

| | | | |
|---|---|---|---|
| 7,191,139 B2 | 3/2007 | Roy et al. | |
| 7,428,756 B2 | 9/2008 | Wookey | |
| 7,523,349 B2* | 4/2009 | Barras | G06F 11/327 714/25 |
| 8,005,778 B2 | 8/2011 | Montgomery | |
| 8,170,971 B1* | 5/2012 | Wilson | G06N 3/02 706/46 |
| 8,694,475 B2* | 4/2014 | Lewis | G06Q 10/06 707/694 |
| 9,021,448 B1* | 4/2015 | Gagliardi | G06F 8/70 717/128 |
| 9,215,142 B1* | 12/2015 | Herold | H04L 41/084 |
| 9,557,879 B1* | 1/2017 | Wang | H04L 41/12 |
| 9,692,654 B2* | 6/2017 | Rosier | H04L 41/0883 |
| 9,792,434 B1* | 10/2017 | Li | G06F 21/554 |
| 2005/0065756 A1* | 3/2005 | Hanaman | G06Q 10/0875 703/2 |
| 2005/0071362 A1 | 3/2005 | Nelson et al. | |
| 2005/0182582 A1* | 8/2005 | Chen | G06F 11/3433 702/108 |
| 2006/0285489 A1* | 12/2006 | Francisco | H04L 12/2859 370/229 |

(Continued)

*Primary Examiner* — Blake J Rubin
(74) *Attorney, Agent, or Firm* — Behmke Innovation Group LLC; Kenneth J. Heywood; Jonathon P. Western

(57) ABSTRACT

In one embodiment, a device in a network maintains an information module to recommend system actions for a monitored system in the network. The information module generates recommendations using an information library database populated by one or more data sources. The device assesses behaviors of the information module and determines a review cadence for the information library database based on the assessed behaviors of the information module. The device updates the information library database according to the determined review cadence.

20 Claims, 10 Drawing Sheets

(56) References Cited

U.S. PATENT DOCUMENTS

| | | | |
|---|---|---|---|
| 2007/0112652 A1* | 5/2007 | Ricketts | G06Q 10/00 705/30 |
| 2008/0215474 A1 | 9/2008 | Graham | |
| 2010/0190142 A1* | 7/2010 | Gal | G09B 5/00 434/322 |
| 2010/0281248 A1* | 11/2010 | Lockhart | G06F 21/577 713/150 |
| 2011/0208750 A1* | 8/2011 | Miyazaki | G06F 16/907 707/748 |
| 2012/0260135 A1* | 10/2012 | Beck | G06F 11/323 714/45 |
| 2013/0290944 A1* | 10/2013 | Menon | G06F 9/453 717/168 |
| 2014/0136690 A1* | 5/2014 | Jain | H04L 41/5012 709/224 |
| 2014/0140494 A1* | 5/2014 | Zhakov | H04M 3/5175 379/265.03 |
| 2014/0164585 A1* | 6/2014 | Shaw | H04L 41/5025 709/223 |
| 2014/0180738 A1* | 6/2014 | Phillipps | G06Q 10/0631 705/7.12 |
| 2014/0304211 A1* | 10/2014 | Horvitz | G08G 1/0104 706/52 |
| 2014/0358828 A1* | 12/2014 | Phillipps | G06N 20/00 706/12 |
| 2015/0082432 A1* | 3/2015 | Eaton | H04L 47/785 726/23 |
| 2015/0149643 A1* | 5/2015 | Hu | H04L 41/0893 709/227 |
| 2015/0193583 A1* | 7/2015 | McNair | G16H 50/20 705/2 |
| 2015/0227838 A1* | 8/2015 | Wang | G06F 11/008 706/12 |
| 2015/0278706 A1* | 10/2015 | Shivashankar | G06N 20/00 706/12 |
| 2016/0028599 A1* | 1/2016 | Vasseur | H04L 41/16 370/252 |
| 2016/0078342 A1* | 3/2016 | Tang | H04L 41/00 706/47 |
| 2016/0078362 A1* | 3/2016 | Christodorescu | G06F 21/566 706/12 |
| 2016/0261468 A1* | 9/2016 | Premkumar | H04L 41/16 |
| 2016/0269908 A1* | 9/2016 | Richards | H04W 12/12 |
| 2016/0364810 A1* | 12/2016 | Yang | G06Q 50/01 |
| 2017/0006135 A1* | 1/2017 | Siebel | H04L 67/02 |
| 2017/0011308 A1* | 1/2017 | Sun | G06F 11/00 |
| 2017/0034023 A1* | 2/2017 | Nickolov | H04L 43/0817 |
| 2017/0053558 A1* | 2/2017 | Zhou | G09B 19/0092 |
| 2017/0063886 A1* | 3/2017 | Muddu | H04L 41/145 |
| 2017/0169438 A1* | 6/2017 | Maynard | G06Q 30/016 |
| 2017/0208151 A1* | 7/2017 | Gil | G06F 21/57 |
| 2017/0237616 A1* | 8/2017 | Akella | G06F 8/20 715/735 |
| 2017/0310546 A1* | 10/2017 | Nair | H04L 41/22 |
| 2017/0344909 A1* | 11/2017 | Kurokawa | G06F 11/30 |
| 2018/0024901 A1* | 1/2018 | Tankersley | G06Q 10/06393 707/694 |
| 2018/0053117 A1* | 2/2018 | Caffrey | H04L 41/16 |
| 2018/0068271 A1* | 3/2018 | Abebe | G06Q 10/103 |
| 2018/0139328 A1* | 5/2018 | Alford | G06Q 50/01 |
| 2018/0150758 A1* | 5/2018 | Niininen | G06N 7/005 |
| 2018/0206135 A1* | 7/2018 | Chow | H04L 43/50 |
| 2018/0206136 A1* | 7/2018 | Chow | H04L 43/0876 |
| 2018/0247354 A1* | 8/2018 | Pratt | G06Q 30/0607 |
| 2018/0253735 A1* | 9/2018 | Bedoun | G06N 7/005 |
| 2018/0285772 A1* | 10/2018 | Gopalan | G06N 7/005 |
| 2018/0285777 A1* | 10/2018 | Li | G06Q 10/06 |
| 2018/0316705 A1* | 11/2018 | Tsironis | H04L 41/22 |
| 2018/0336479 A1* | 11/2018 | Guttmann | G06N 20/00 |
| 2019/0034824 A1* | 1/2019 | Cagadas | H04L 51/02 |

* cited by examiner

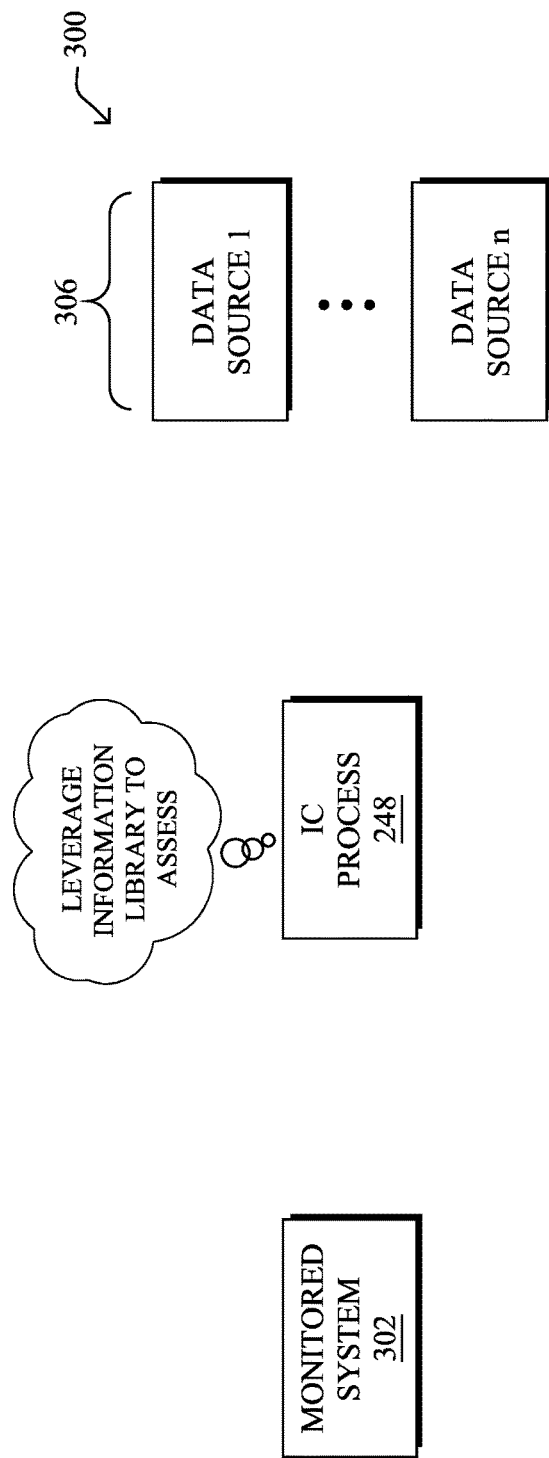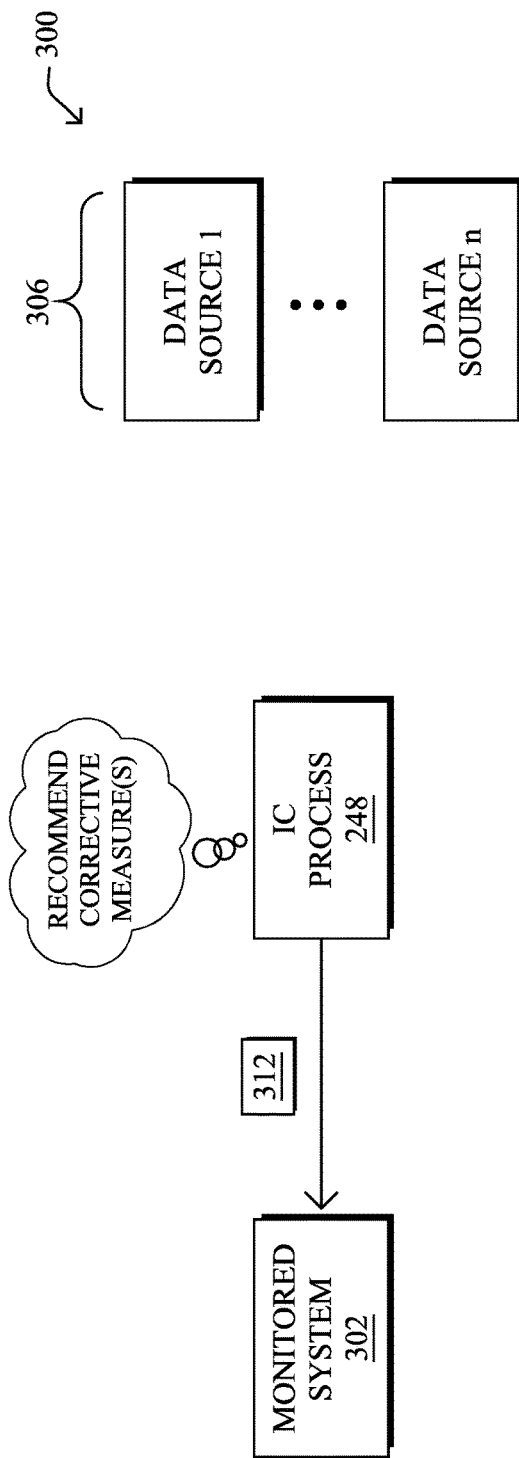

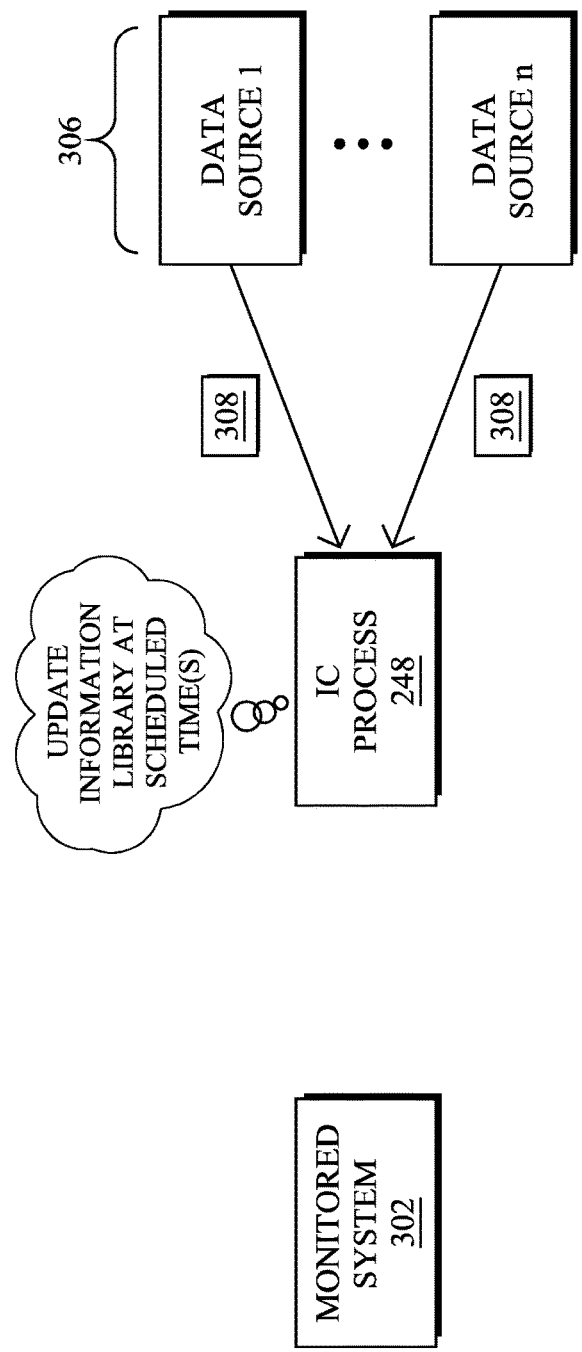

DYNAMIC REVIEW CADENCE FOR INTELLECTUAL CAPITAL

TECHNICAL FIELD

The present disclosure relates generally to computer networks, and, more particularly, to reviewing cadence for intellectual capital.

BACKGROUND

Many organizations now include a network operations center (NOC) that is responsible for managing the daily operations of the organization's devices and communication networks. Typically, a technology assistance center (TAC) also works closely with the NOC and provides support to users, to resolve technical issues that may arise. For example, a user may open a TAC support ticket and a support specialist may help to diagnose and resolve the technical issue experienced by the user.

In general, intellectual capital (IC) encompasses a variety of information from multiple data sources, including, for example, online resources, human experts, etc. For example, in the contexts of network operations and/or user support, information regarding how to resolve a technical issue or evaluate the performance of the network may come from a manufacturer's website, from a seasoned network expert in the organization, from a message board, etc. Such IC may also be captured within a management/support system, thereby allowing the users of the system to share and leverage the collective information. For example, a network expert may create an entry in the management system that lists the steps to resolve a particular networking issue. In turn, whenever this issue appears, the guidance from the network expert can be accessed and leveraged, to resolve the issue. However, in some cases, this captured information may become stale over time. Notably, as time passes, information and resources change (e.g., new software versions are released, software bugs are fixed, hardware becomes unavailable, people leave organizations; etc.), and IC that rely on these resources may quickly become out of date.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 3A-3E illustrate an example implementation of an IC process;

DESCRIPTION OF EXAMPLE EMBODIMENTS

Overview

According to one or more embodiments of the disclosure, a device in a network maintains an information module to recommend system actions for a monitored system in the network. The information module generates recommendations using an information library database populated by one or more data sources. The device assesses behaviors of the information module and determines a review cadence for the information library database based on the assessed behaviors of the information module. The device updates the information library database according to the determined review cadence.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1A:
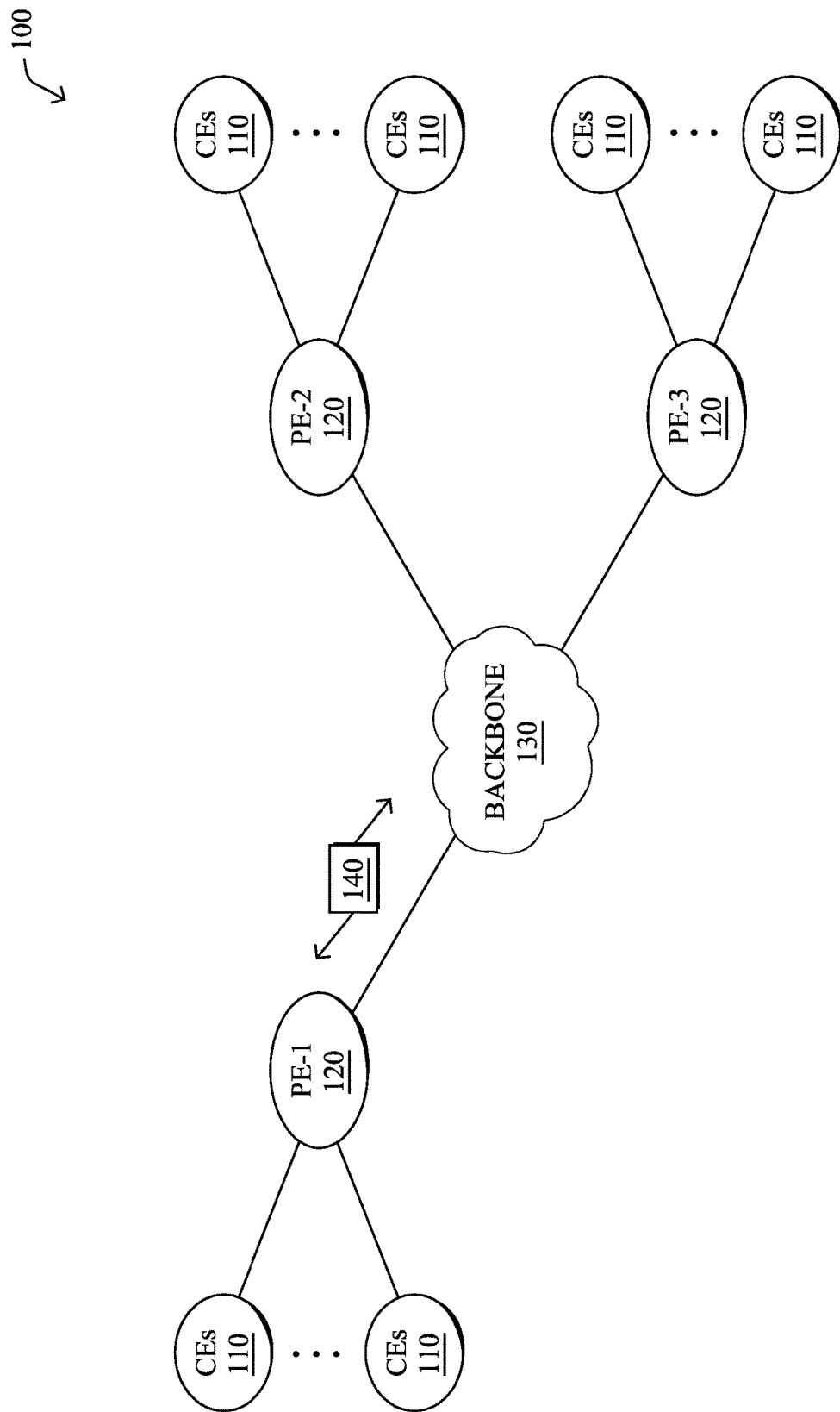
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
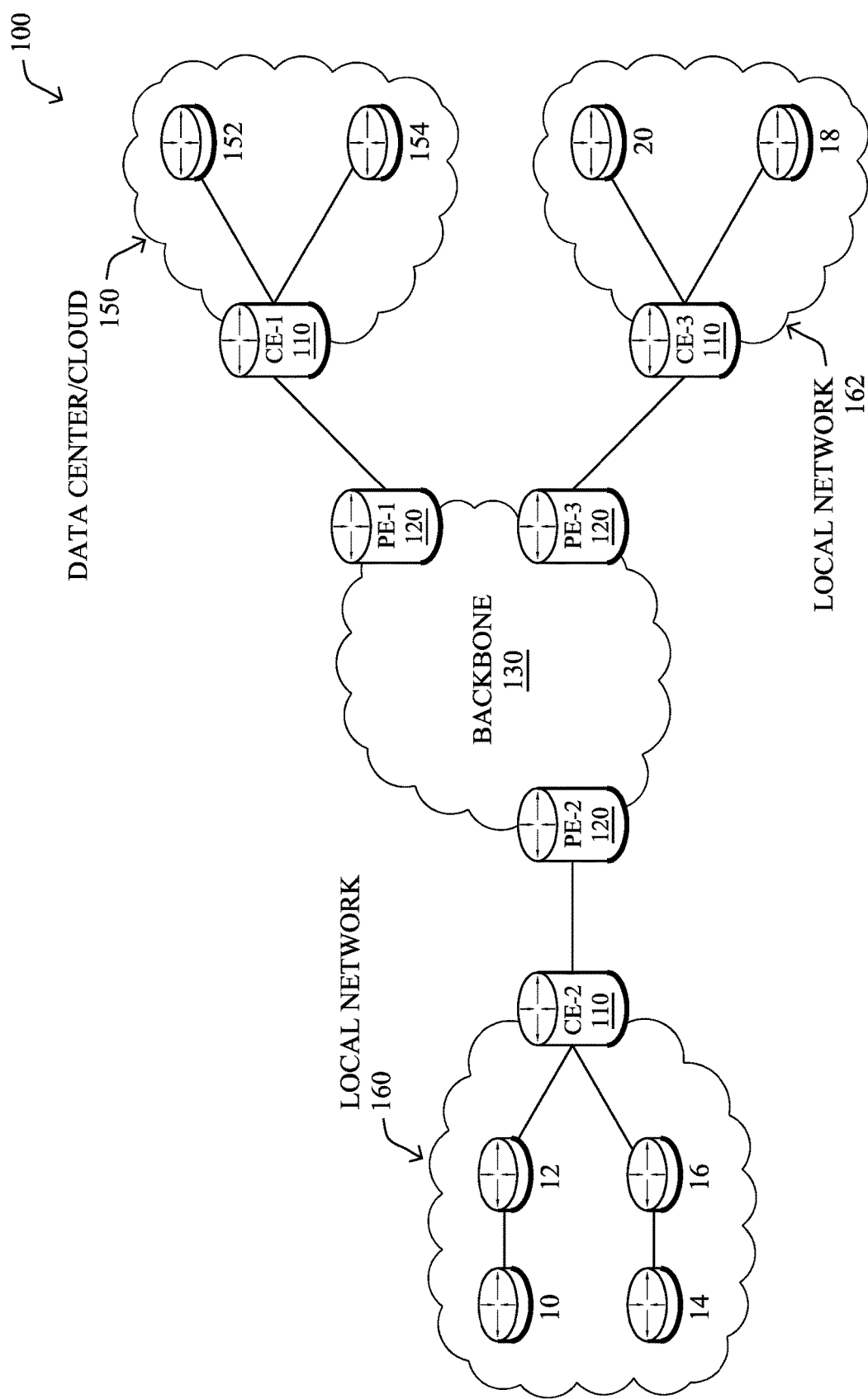

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, networks 160, 162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), etc. As would be appreciated, network 100 may include any number of local networks, data centers, cloud environments, devices/nodes, servers, etc.

Figure 2:
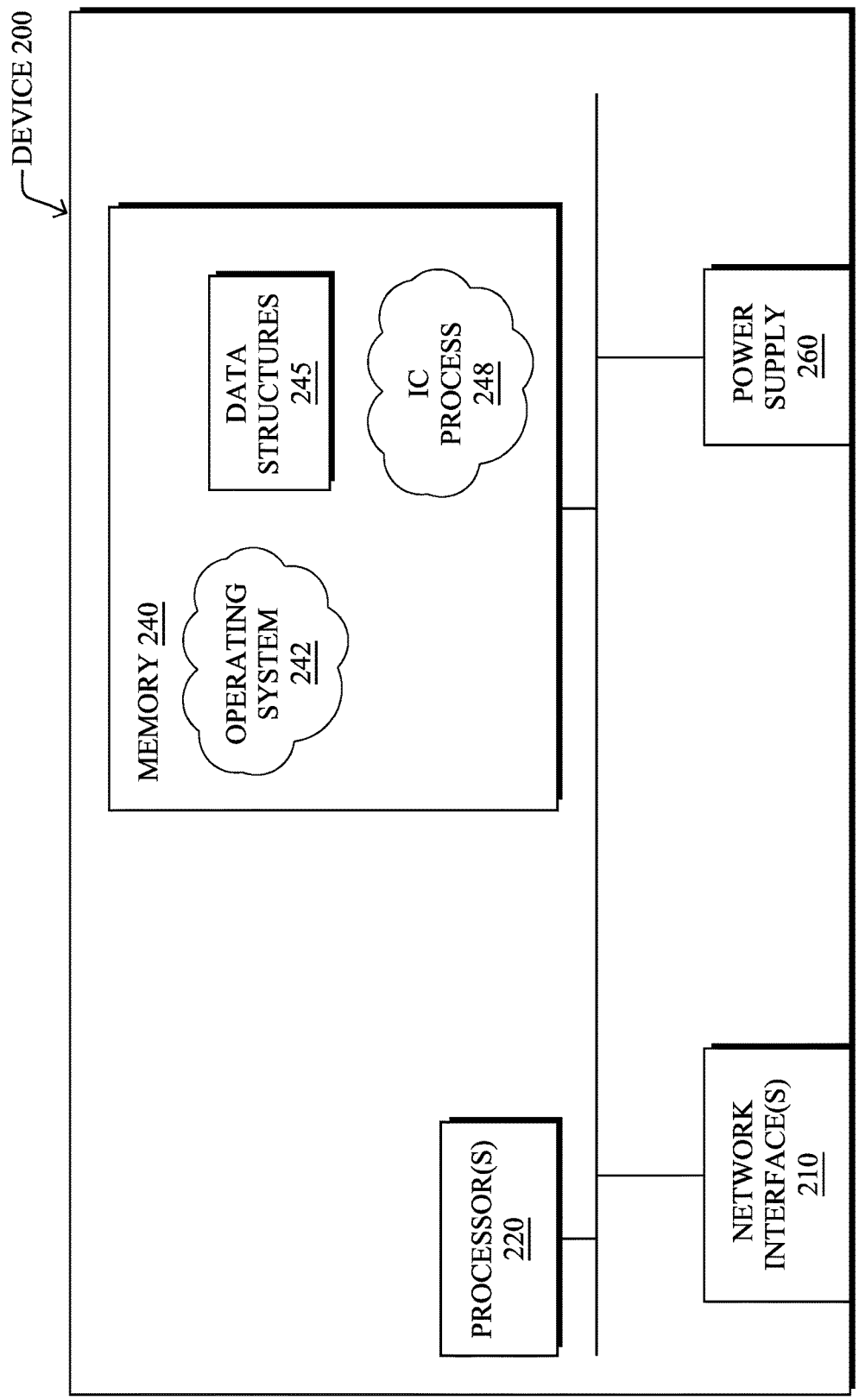
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interfaces 210 include the mechanical, electrical, and signaling circuitry for communicating data over data links coupled to network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art. Note, further, that the nodes/devices may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor, functionally organizes the node by, among other things, invoking network operations in support of software processors and/or services executing on the device. These software processors and/or services may comprise an illustrative IC process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, various forms of IC applications/services exist. For example, articles, knowledge bases, management/support programs, document repositories, and the like, may be leveraged by an organization. However, IC maintenance is typically challenging, particularly to ensure that the IC remains up to date and the information used and/or produced is fresh and correct.

Dynamic Review Cadence for Intellectual Capital

The techniques herein enable the use of a dynamic review cadence in an IC system, automatically and dynamically determining when a set of information (e.g., a recommended system action for a monitored system, etc.) should be reviewed and/or updated for accuracy. In some aspects, this determination may be based on an analysis of the behavior of an information module itself within the IC system (e.g., a logic module that maps one or more characteristics of the monitored system to corresponding information, such as a recommended system action). For example, the review cadence may be based on temporally-related objects within the information itself and/or in the output of the module during execution.

Specifically, according to one or more embodiments of the disclosure as described in detail below, a device in a network maintains an information module to recommend system actions for a monitored system in the network. The information module generates recommendations using an information library database populated by one or more data sources. The device assesses behaviors of the information module and determines a review cadence for the information library database based on the assessed behaviors of the information module. The device updates the information library database according to the determined review cadence.

Illustratively, the techniques described herein may be performed by hardware, software, and/or firmware, such as in accordance with the IC process 248, which may include computer executable instructions executed by the processor 220 (or independent processor of interfaces 210) to perform functions relating to the techniques described herein.

Operationally, FIGS. 3A-3E illustrate an example implementation 300 of IC process 248. As shown, in some embodiments, IC process 248 may be configured to store and maintain information that may be of relevance to a monitored system 302, such as a network, information technology (IT) infrastructure, or the like. Logically, IC process 248 may include any number of information modules that relate to different characteristics of monitored system 302 (e.g., topics regarding system 302, parameters of system 302, an observed behavior of system 302, etc.). For example, an automated problem detection system for a computer network may use a library of 10,000+ information modules.

Figure 3A:
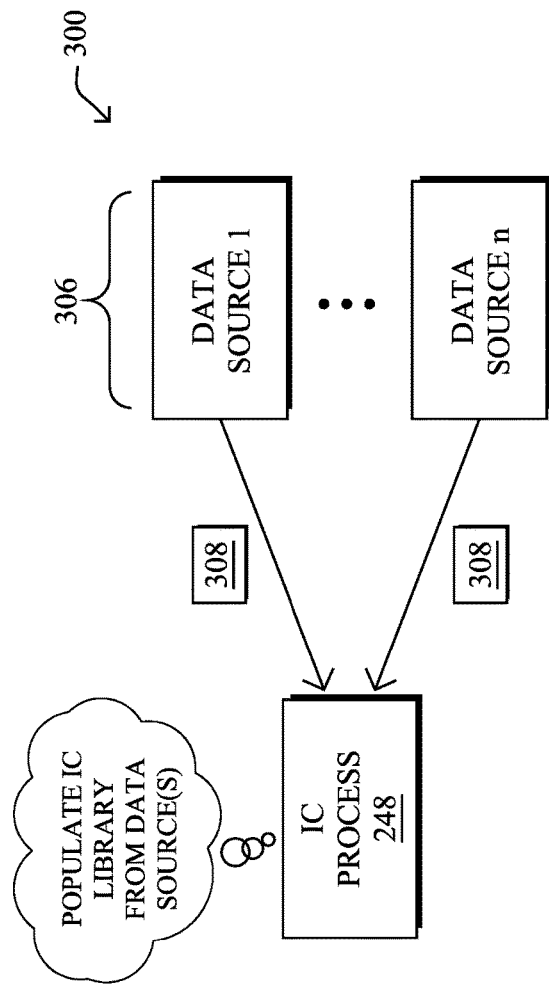

In general, as shown in FIG. 3A, there may be any number of data sources 306 (e.g., a first through nth data source) that provide data/information 308 to IC process 248 for use by the information modules of IC process 248. Example types of data sources 306 may include, for example, bug databases, version matrices, code recommendations, service knowledge and experience from an expert entered via a user interface, etc. As a more concrete example, a particular information module may relate a characteristic of the network, such as a given error code, to a listing of corrective measures, such as "this issue is resolved by updating to OS version 10.4."

Figure 3B:
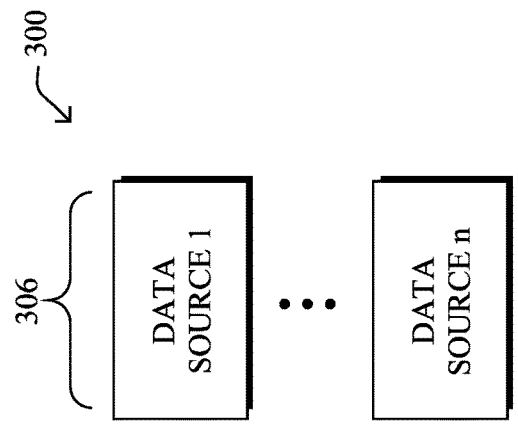

As shown in FIG. 3B, monitored system 302 may communicate one or more characteristics 310 to IC process 248. Characteristics may include, for example, a configuration of system 302, a system state of system 302, a software and/or hardware version of system 302, a notification of a system or device status, one or more parameters used by monitored system 302, a determination of one or more process/device issues experienced by monitored system 302, etc., or the like. In various embodiments, such characteristics may be associated with the information modules of process 248, which leverage gathered information from data source(s) 306 within an information library database.

In FIG. 3C, assume that characteristics 310 indicate a particular issue with monitored system 302 and that a given information module of IC process 248 is associated with this issue. In such a case, as shown, IC process 248 may leverage its information library database for that information module, to assess the issue.

As shown in FIG. 3D, once the appropriate information module of IC process 248 has identified the corresponding information from its information library database, it may send a recommendation or other notification 312 to monitored system 302, to a different system, and/or to a user interface for review by a user. For example, such a recommendation/notification 312 may indicate "Upgrade to version 9.1(2) to get the fix for CSCsy93944."

In FIG. 3E, IC process 248 may update at least a portion of its information library database at scheduled times, in various embodiments. A given information module of IC process 248 may map one or more characteristics of monitored system 302 to one or more recommended system actions, notices, etc. in its information library (e.g., as populated by data source(s) 306). Thus, proper and accurate assessment of system characteristics of monitored system 302 and identification of the appropriate system actions or other notifications requires that the information library of IC process 248 be kept up to date.

In various embodiments, IC process 248 may require a review of the information of a given information module after a certain amount of time has passed. For example, IC process 248 may simply associate an expiration date of one year to any newly entered information from a data source 306. In another example, IC process 248 may set a universal review cadence for the information that requires an expert to verify that the information in the information library has not become stale. However, both approaches are static and do not take into account the temporal aspects involved.

Take the following as an example:
An information module of IC process 248 analyzes the device output and the device metadata provide by an analytic system (e.g., system 302).
That information module checks the version of the device (e.g., from the metadata) against a list of versions that are known to be affected by a specific problem (e.g., from the information library of IC process 248).
The information module of IC process 248 finds a match and then recommends that the user upgrade the system to a specific version that remedies the aforementioned problem.

In the above example, there are actually two temporal variables involved:
1. The information module of IC process 248 is checking against a list of versions.
2. The information module is providing a recommended code version.

Both of these two temporal variables may change over times, meaning that the information library database entries for the information module should be reviewed for validity every so often.

According to various embodiments, rather than take a static approach to the reviews of its information database entries, IC process 248 may implement a review cadence based on some or all of the following factors:

Which time-based variables, if any, are included within the content of the information database entries for the information module itself.
The specific data structures the information module uses as input to make its judgement (e.g., how the information module handles, queries, and manipulates the input data).
The results/output produced by the information module.

In other words, IC process 248 may base the review cadence for a given information module on the stored library information for this module and/or on the behavior of the module during use (e.g., its treatment of its inputs, outputs, etc.). In doing so, IC process 248 may assign different review cadences to different ones of its information modules.

Figure 4A:
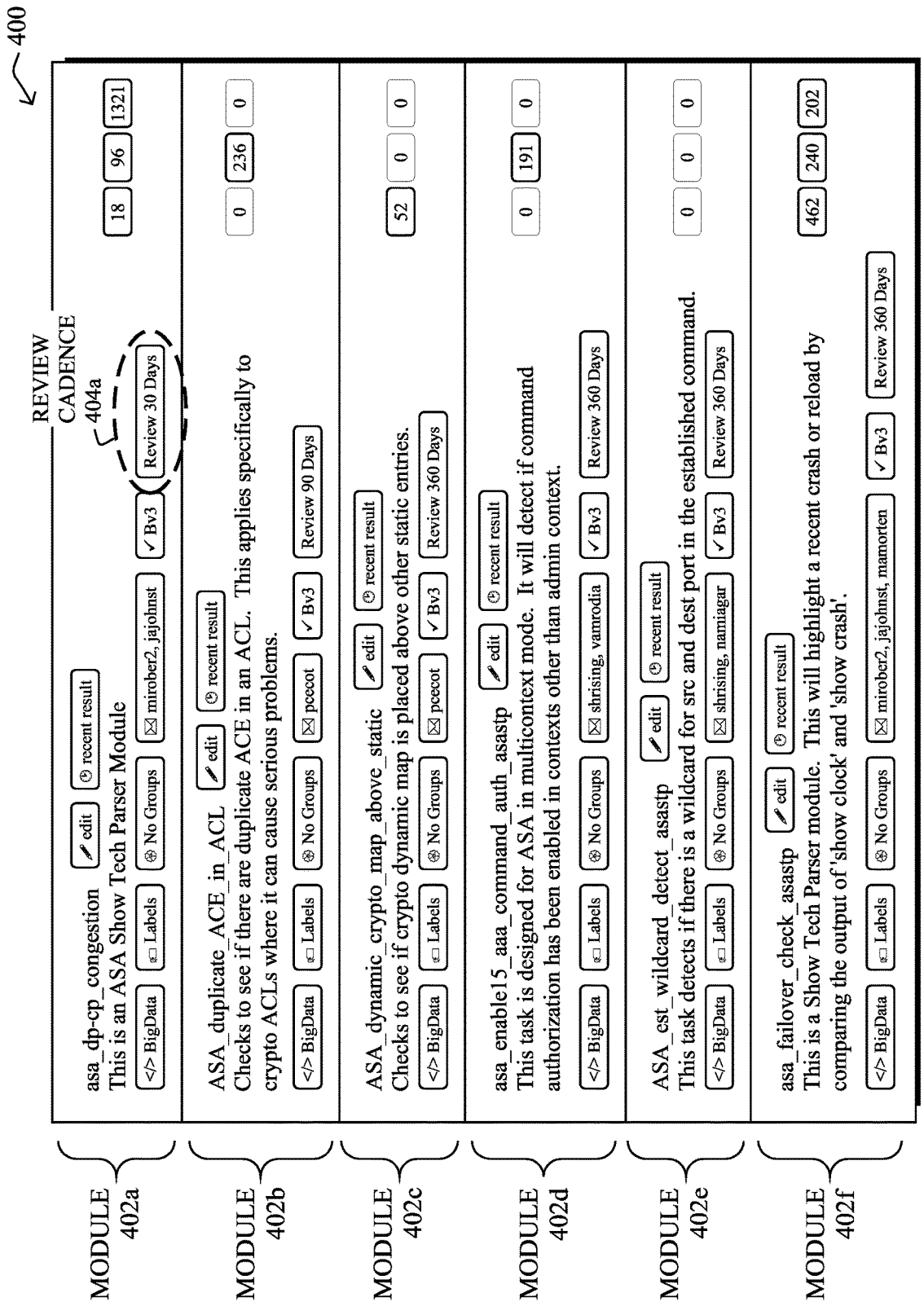
FIGS. 4A-4C illustrate examples of review cadences for different information modules.
Figure 4B:
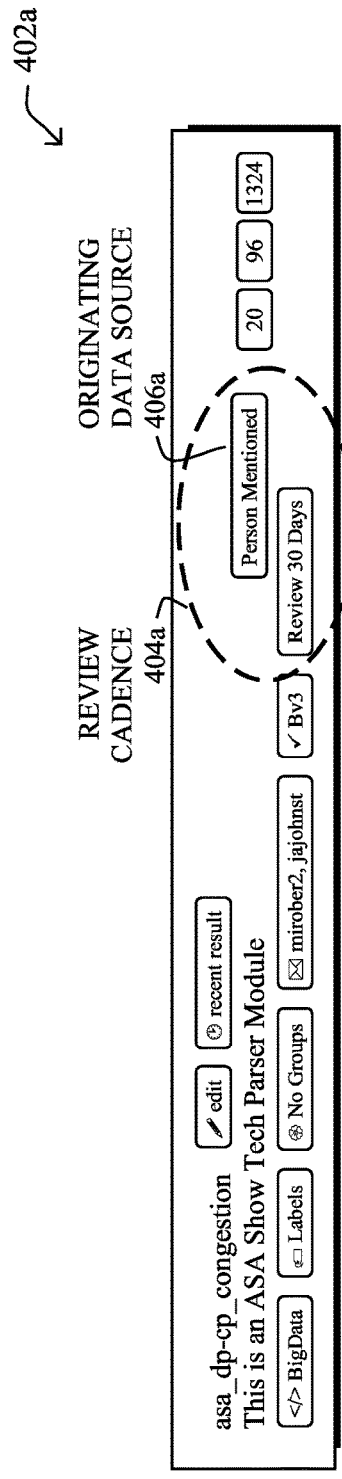
Figure 4C:
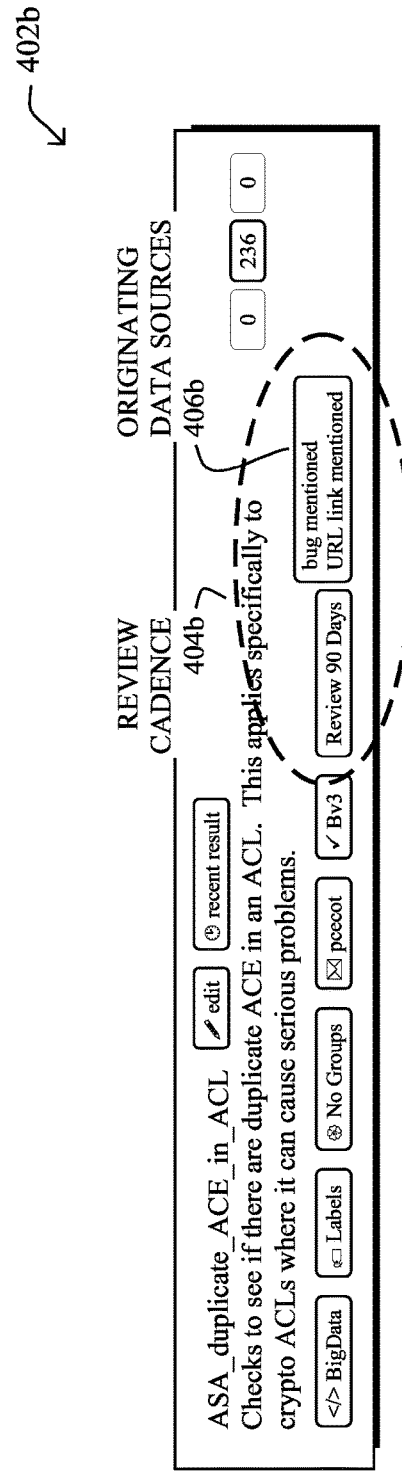

FIGS. 4A-4C illustrate examples of review cadences for different information modules, according to various embodiments. As shown in example 400 in FIG. 4A, IC process 248 may cause information modules 402a-402f to be displayed on an electronic display for review by a user. For example, a network expert may review each information module 402a-402f, to ensure that their associated information (e.g., in the information library database) is up to date and accurate. In particular, as shown, each of information modules 402a-402f may have an associated review cadence 404 that may be based on any temporal variables associated with the information module.

By way of more specific example, information module 402a may include a review cadence 404a that serves as a reminder to the user to verify the information of module 402a every thirty days, as shown in FIG. 4A and in greater detail in FIG. 4B. Conversely, as shown in FIG. 4A and in greater detail in FIG. 4C, information module 402b may instead have a review cadence 404b of ninety days, three times that of information module 402a.

In addition to displaying the review cadences 404 for information modules 402, IC process 248 may also provide an indication of the data sources (e.g., data sources 306) that provided the information in the information library database associated with the information module. For example, in FIG. 4B, the originating data source 406a, e.g., "person mentioned" may be indicated as the originator of the information. Similarly, in FIG. 4B, the originating data source 406b may indicate that the information was supplied by an online source having a specific universal resource locator (URL).

Figure 5:
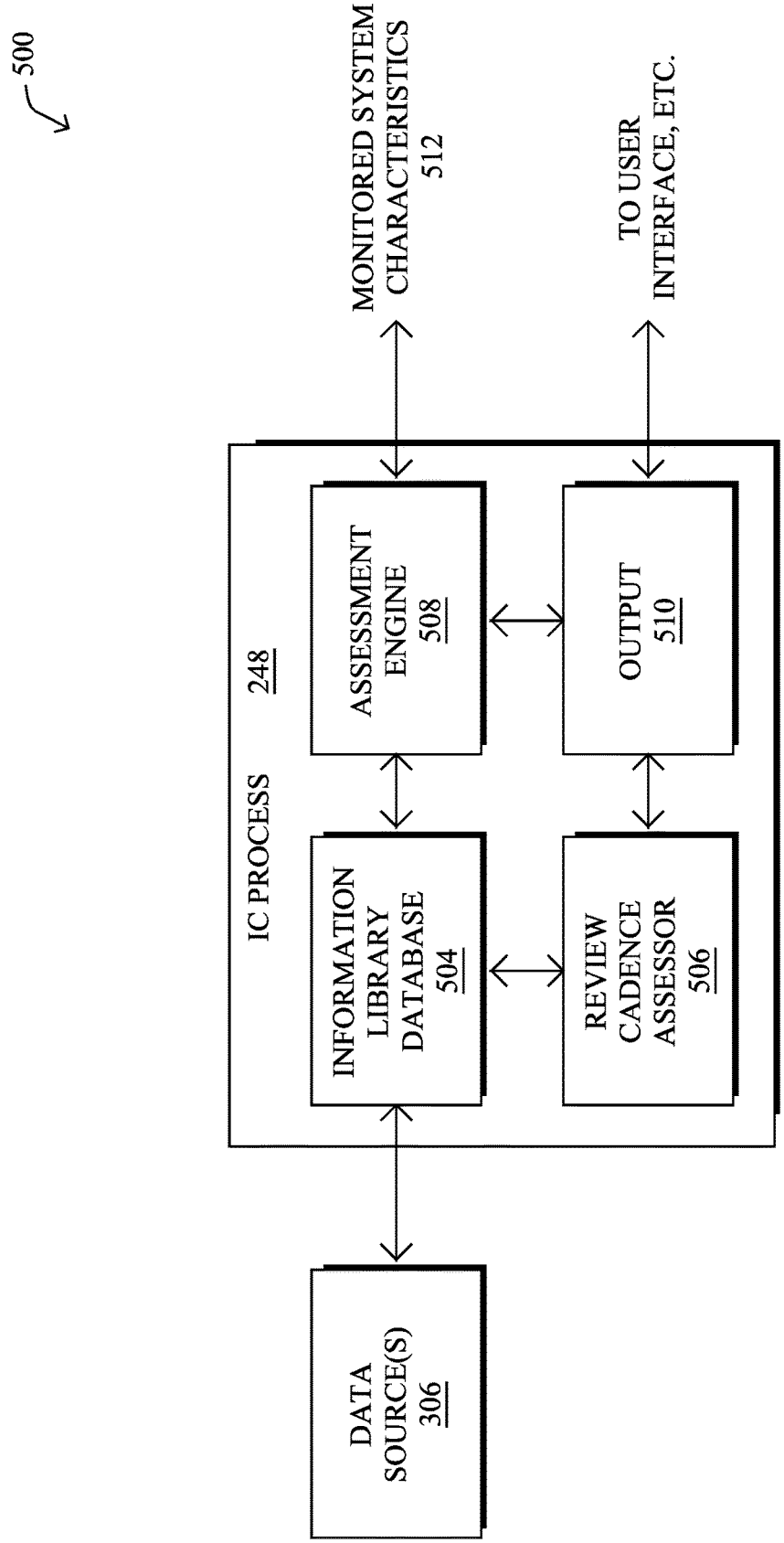
FIG. 5 illustrates an example architecture to implement an IC process.

FIG. 5 illustrates an example architecture 500 for implementing an IC process 248, according to various embodiments. As shown, architecture 500 may include an information library database 504, which may be a compilation or aggregate of information provided from one or more data sources 306. The entries of information library database 504 may be associated with any number of information modules that relate the information (e.g., recommended system actions, etc.) to conditions of the monitored system. For example, one information module may provide additional context to a given parameter or measurement from the monitored system.

Assessment engine 508 may receive characteristics 512 of the monitored system and, in turn, leverage the corresponding information module(s) to retrieve the stored information in information library database 504. Based on this, assessment engine 508 may generate output 510 (e.g., context information, a recommended system action, etc.) which is sent to a user interface, the monitored system, or the like. For example, given a certain parameter of the monitored system in characteristics 512, assessment engine may retrieve a description of the parameter from information library database 504 and the recommended course of action when this parameter has a certain value.

According to various embodiments, IC process 248 may also include a review cadence assessor 506 that determines, for a given information module, an appropriate review cadence for that information module. In other words, for a given information module, review cadence assessor 506 may determine how frequently an expert user or system should review the corresponding information in information library database 504 for that module. In turn, review cadence assessor 506 may include the determined cadence in output 510 (e.g., to notify the expert when the information module and its information should be reviewed for validity).

In one embodiment, review cadence assessor 506 may determine an initial review cadence for an information module, prior to IC process 248 executing the module. Notably, review cadence assessor may perform a static analysis of the information in information library database 504, to examine the information associated with the information module, looking for data types that have been specified as having a temporal aspect. For example, dates, links, etc., in the information for the information module may each have an assigned review cadence. In turn, if review cadence assessor 506 only uses this static analysis, then the data type with the shortest review cadence becomes the review period for the information. However, when the information module is actually run, more dynamic approaches may be taken, as described below.

A non-exhaustive list of example temporal variables that review cadence assessor 506 may identify and use to determine the review cadence for a given information module are shown in Table 1 below:

In further embodiments, review cadence assessor 508 may take a more dynamic approach to determining the review cadence for a given information module based on the behavior of the information module during execution. In some cases, review cadence 508 may perform a runtime analysis of the information module by watching how the code of the information module accesses metadata about the monitored system. For example, review cadence assessor 508 may assess whether a given information module is looking at a device's version, platform, running image, or the status of a bug or other object. More specifically, an information module may attempt to access a data object derived from the input data (e.g., characteristics 412) that describe the version of the device being analyzed. Review cadence assessor 508 can track the access of this object at runtime and use this as an indication that the information module is going to use the version, which has a temporal aspect to it since it can change over time, as part of its assessment. In another example, review cadence assessor 508 can also consider when a given file was last updated. In turn, based on the identified temporal aspects, review cadence assessor 508 may determine the appropriate review cadence for the entry in information library database 504 associated with the information module.

In further embodiments, review cadence assessor 506 may perform output analysis on output 510, to determine the appropriate review cadence for the information module that produced output 510. For example, if the information module raises an alert and instructs the user to take a particular system action and, in doing so, mentions something that may

TABLE 1

| Temporal Variable | Example source code or text output | Review Cadence |
|---|---|---|
| A date | "This problem should be fixed on the server by June 21st" | Adjust based on the date (1 week prior) |
| Device Version | code: if device['version'] >9.1.4: print ('not affected by this problem') | 3 months |
| Upgrade for a fix | "Upgrade to version 9.1(2) to get the fix for CSCsy93944" | 3 months |
| General code recommendation | "Moving to the latest version is advised for this platform." | 3 months |
| Interaction with third party | "If you see this issue, reach out to jeff@example.com and let them know" | 1 month |
| Hardware Recommendation | "This device is oversubscribed. Upgrade to the XL4211." | 6 months |
| A hyperlink or reference | "This is a common issue that is well documented at http://www.example.com/issue3918.html" | 1 year (if hyperlink is active); else immediately upon detection of dead link |
| Bug or Defect Id | "This is being tracked by Bug Id CSCab12345 which is still being worked on." | 1 month for unresolved bugs; 1 month for resolved bugs without images; 1 year for resolved bugs with images with fixes |
| Highlighting tooltip | A highlighting tooltip embedded in a configuration tool | 2 years |
| New Machine Created IC | New IC created automatically by a Machine | 1 week |
| No variable match | IC that has no temporal variables detected. | 5 years after initial review | be temporal in nature, review cadence assessor 506 may flag the information module for review in a similarly appropriate cadence.

For example, assume that output 510 reports back about a code recommendation. In such a case, review cadence assessor 506 may determine that the appropriate review cadence for the information module that produce this code recommendation is two months, due to the nature of code recommendations. Determining that output 510 includes a code recommendation could be done by review cadence assessor 506 using, for example, Natural Language Processing (NLP), or by using simple pattern recognition (e.g., to identify version numbers in output 510).

In another example, the information in database 504 for a certain information module may recommend that the user contact someone about the corresponding issue (e.g., "If you hit this issue, contact jeff@example.com and let them know"). In turn, review cadence assessor 506 may adjust the review cadence accordingly, to take into account the fact that employees may leave, etc.

In a further example, a given information module may compute the time at which a significant event might occur, such as when a popular certificate will expire. In such a case, review cadence assessor 506 may review the expiration date in output 510 and, in turn, adjust the review period such that the information is reviewed prior to the expiration of the certificate.

Similar to the static review case, if review cadence assessor 506 encounters multiple temporal variables, either in the executing logic of an information module, or in output 510, it may select the shortest review period associated with any of these variables. For example, if one temporal variable indicates a review cadence of six months, but another temporal variable indicates a review cadence of only three months, review cadence assessor 506 may opt to use a review cadence of three months.

Figure 6:
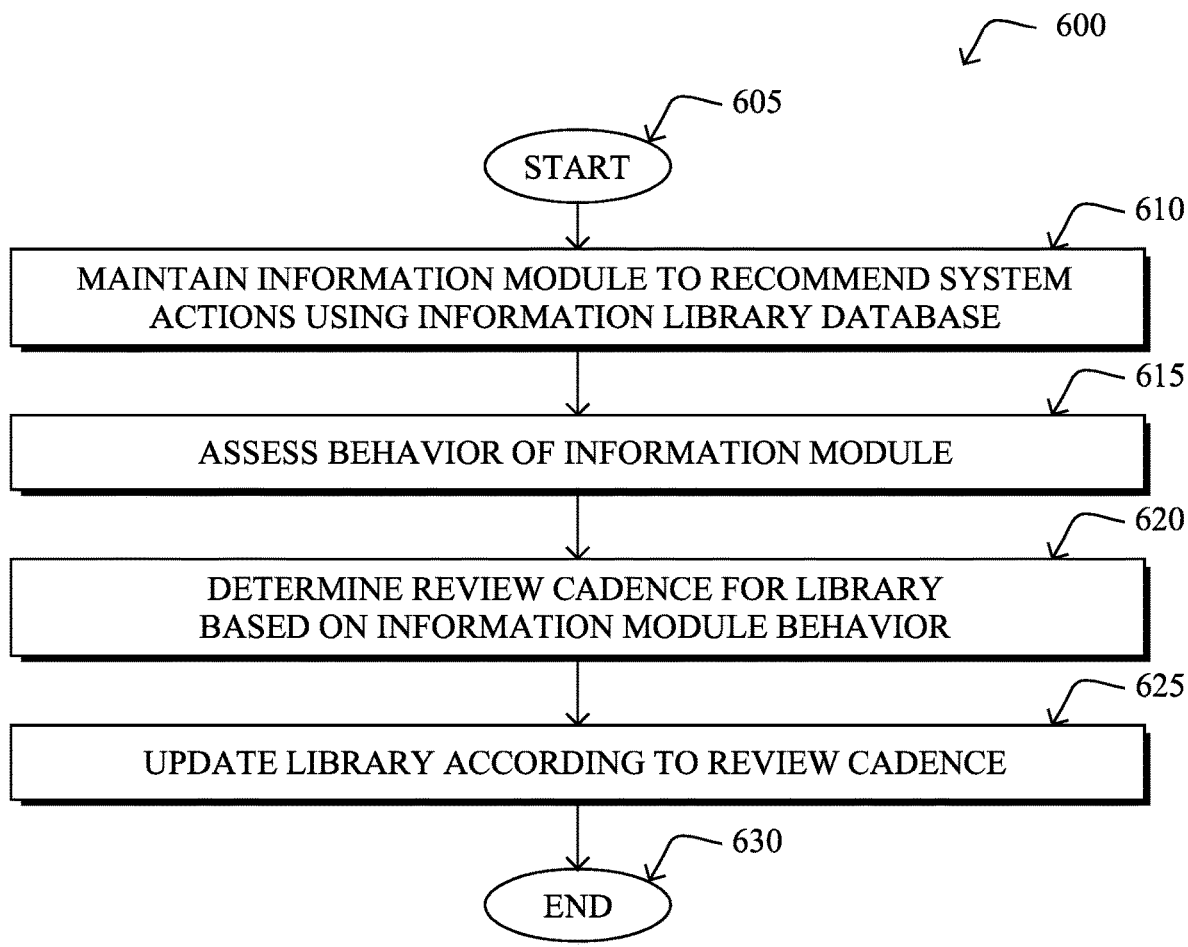
FIG. 6 illustrates a simplified procedure for implement an IC process.

FIG. 6 illustrates an example simplified procedure for implementing an IC process in a network, in accordance with one or more embodiments described herein. For example, a non-generic, specifically configured device (e.g., device 200) may perform procedure 600 by executing stored instructions (e.g., process 248). Procedure 600 may start at step 605, and continues to step 610, where, as described in greater detail above, a device in a network maintains an information module to recommend system actions for a monitored system in the network using an information library database, which may be populated by one or more data sources. In some embodiments, the device may receive one or more characteristics of the monitored system, and the recommended system action may be based on the received characteristic(s).

In step 615, as detailed above, the device may assess behaviors of the information module. For example, the device may identify one or more characteristics of the monitored system received by the information module, such as from the information library database. In addition, the device may assess recommended system actions output by the information module.

In step 620, the device may determine a review cadence for the information library database based on the assessed behaviors of the information module, as described in greater detail above. In some embodiment, a suitable review cadence may be determined based on the behavior of the information module(s), such as upon receipt of (e.g., input), during implementation of (e.g., runtime), and/or in response to (e.g., output) the system characteristic.

In step 625, the device may update the information library database according to the determined review cadence. As described in more detail above, the device may obtain the updated data from one or more data sources. Procedure 600 may then end at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, dynamically determining the review cadence for information modules based on how the module behaves or what it alerts. The task of re-reviewing an information module is simplified and focused on only the module that would logically need re-reviewing, which is typically a smaller portion of the total number of modules. As described above, changes to review cadences are based on specific content of the modules, and, as a result, resources and time are not wasted reviewing what does not need to be reviewed, improving the overall review cadence process and allowing for significant scale.

While there have been shown and described illustrative embodiments that provide for implement an IC process, it is to be understood that various other adaptations and modifications may be made within the spirit and scope of the embodiments herein. For example, while certain embodiments are described herein with respect to using certain architectures and components for purposes of review cadence assessment, other architectures and components may also be used, in other embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   maintaining, by a device in a network, an information module to recommend system actions for a monitored system in the network, wherein the information module generates recommendations using an information library database populated by one or more data sources and wherein the information library database includes information associated with how to solve a particular issue within the monitored system;
   assessing, by the device, behaviors of the information module;
   dynamically determining, by the device, a review cadence for the information library database based on the assessed behaviors of the information module, wherein the review cadence determines how frequently a set of information within the information library database should be reviewed or updated for accuracy;

sending, by the device and in accordance with a frequency determined by the review cadence, a notification to review or update the set of information within the information library database; and updating, by the device, the information library database according to the determined review cadence.

2. The method as in claim 1, wherein updating the information library database comprises:

obtaining, by the device and from the one or more data sources, updated data for the information library database.

3. The method as in claim 1, further comprising:

determining, by the device, an initial review cadence for the information library database based on one or more data types in the information library database.

4. The method as in claim 3, wherein each of the one or more data types in the information library database is associated with a review cadence, and wherein determining the initial review cadence for the information library database further comprises:

setting, by the device, the initial review cadence equal to a shortest review cadence associated with any of the one of the one or more data types.

5. The method as in claim 1, wherein assessing behaviors of the information module comprises:

identifying, by the device, one or more characteristics of the monitored system that are queried by the information module from the information library database, wherein the review cadence is determined based in part on the identified one or more characteristics.

6. The method as in claim 1, wherein assessing behaviors of the information module comprises:

assessing, by the device, recommended system actions output by the information module, wherein the review cadence is determined based in part on the recommended system actions.

7. The method as in claim 1, further comprising:

receiving, by the device, one or more characteristics of the monitored system;

using, by the device, the information module to generate a recommended system action based on the one or more received characteristics of the monitored system; and providing, by the device, an indication of the recommended system action to a user interface.

8. The method as in claim 1, wherein the behavior corresponds to a use of a temporal-sensitive variable by the information module.

9. An apparatus, comprising:

one or more network interfaces to communicate with a network;

a processor coupled to the network interfaces and configured to execute one or more processes; and a memory configured to store a process executable by the processor, the process when executed operable to:

maintain an information module to recommend system actions for a monitored system in the network, wherein the information module generates recommendations using an information library database populated by one or more data sources and wherein the information library database includes information associated with how to solve a particular issue within the monitored system;

assess behaviors of the information module;

dynamically determine a review cadence for the information library database based on the assessed behaviors of the information module, wherein the review cadence determines how frequently a set of information within the information library database should be reviewed or updated for accuracy;

send, in accordance with a frequency determined by the review cadence, a notification to review or update the set of information within the information library database; and update the information library database according to the determined review cadence.

10. The apparatus as in claim 9, wherein the apparatus updates the information library database by:

obtaining, from the one or more data sources, updated data for the information library database.

11. The apparatus as in claim 9, wherein the process when executed is further operable to:

determine an initial review cadence for the information library database based on one or more data types in the information library database.

12. The apparatus as in claim 11, wherein each of the one or more data types in the information library database is associated with a review cadence, and wherein determining the initial review cadence for the information library database further comprises:

setting the initial review cadence equal to a shortest review cadence associated with any of the one of the one or more data types.

13. The apparatus as in claim 9, wherein the apparatus assesses the behaviors of the information module by:

identifying one or more characteristics of the monitored system that are queried by the information module from the information library database, wherein the review cadence is determined based in part on the identified one or more characteristics.

14. The apparatus as in claim 9, wherein the apparatus assesses the behaviors of the information module by:

assessing recommended system actions output by the information module, wherein the review cadence is determined based in part on the recommended system actions.

15. The apparatus as in claim 9, wherein the process when executed is further operable to:

receive one or more characteristics of the monitored system;

use the information module to generate a recommended system action based on the one or more received characteristics of the monitored system; and provide an indication of the recommended system action to a user interface.

16. The apparatus as in claim 9, wherein the behavior corresponds to a use of a temporal-sensitive variable by the information module.

17. A tangible, non-transitory, computer-readable medium storing program instructions that cause a device in a network to execute a process comprising:

maintaining, by the device, an information module to recommend system actions for a monitored system in the network, wherein the information module generates recommendations using an information library database populated by one or more data sources and wherein the information library database includes information associated with how to solve a particular issue within the monitored system;

assessing, by the device, behaviors of the information module;

dynamically determining, by the device, a review cadence for the information library database based on the assessed behaviors of the information module, wherein the review cadence determines how frequently a set of information within the information library database should be reviewed or updated for accuracy;

sending, by the device and in accordance with a frequency determined by the review cadence, a notification to review or update the set of information within the information library database; and updating, by the device, the information library database according to the determined review cadence.

18. The computer-readable medium as in claim 17, wherein the process further comprises:

determining, by the device, an initial review cadence for the information library database based on one or more data types in the information library database.

19. The computer-readable medium as in claim 17, wherein assessing behaviors of the information module comprises:

identifying, by the device, one or more characteristics of the monitored system that are queried by the information module from the information library database, wherein the review cadence is determined based in part on the identified one or more characteristics.

20. The computer-readable medium as in claim 17, wherein assessing behaviors of the information module comprises:

assessing, by the device, recommended system actions output by the information module, wherein the review cadence is determined based in part on the recommended system actions.

\* \* \* \* \*